Figures 1, 2:
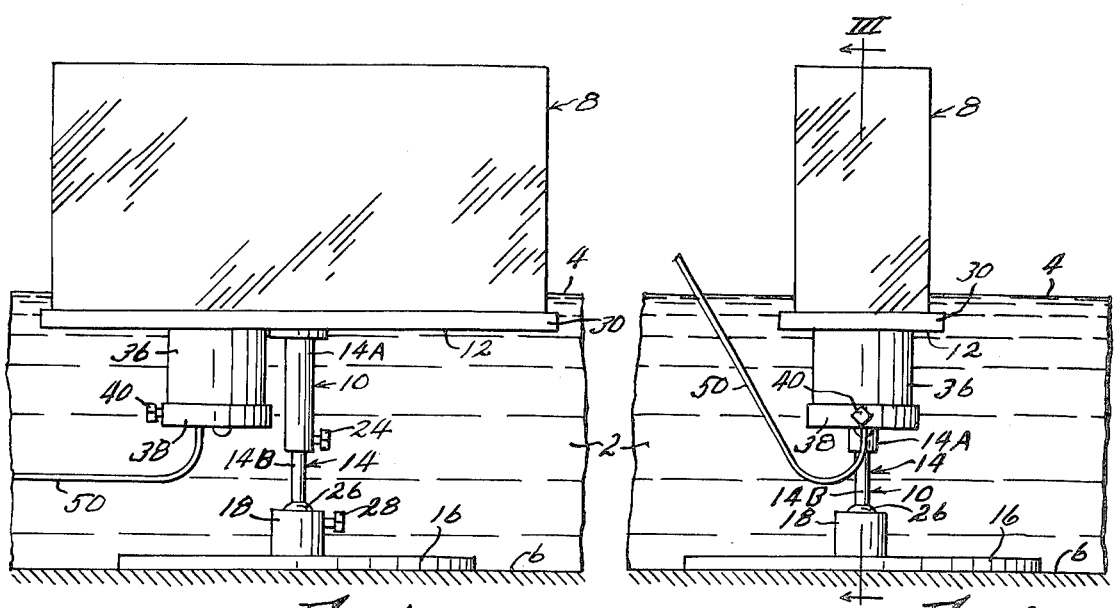

United States Patent [19]
Scantlin

[11] 3,921,584
[45] Nov. 25, 1975

[54] FISH DISPLAY DEVICE

[76] Inventor: William J. Scantlin, 4136 N. Kansas St., Kansas City, Mo. 64117

[22] Filed: Aug. 22, 1974

[21] Appl. No.: 499,532

[52] U.S. Cl. ................................................... 119/5
[51] Int. Cl.² ......................................... A01K 63/00
[58] Field of Search ........................... 119/5, 3, 2, 4

[56] References Cited
UNITED STATES PATENTS
1,943,417  1/1934  Bringman............................... 119/5
3,216,395  11/1965  Girard..................................... 119/5

*Primary Examiner*—J. N. Eskovitz
*Attorney, Agent, or Firm*—John A. Hamilton

[57] ABSTRACT

A fish display device consisting of a hollow, transparent body member open only at its bottom, and a stand for supporting the body member principally above the water level of a larger body of water but with its bottom just below the water level. The body member is filled with water supported therein by atmospheric pressure, so that fish may swim therein for display purposes. For better display of the fish, the body member may be be partitioned to form a maze having an inlet and an outlet, and a water impellor may be provided to produce a current of water through the maze, to encourage fish to swim against the current.

4 Claims, 3 Drawing Figures

FISH DISPLAY DEVICE

This invention relates to new and useful improvements in fish display devices, and has particular reference to a device for better displaying to public view fish contained in aquariums, fish ponds and pools, and the like. It is perhaps most useful in connection with outdoor fish ponds and pools, which ordinarily do not have side observation windows through which the fish may be viewed, and in which any view of the fish through the water surface is commonly obstructed by skylight reflections from said surface or by roughening of said surface by winds or breezes. The device also has utility even in indoor aquariums having side observation windows, however, since aquariums often are equipped with underwater structures, marine growth and the like for providing a more natural habitat for the fish, but which often obstruct good observation, and also since the aquarium water is often murky at least to the extent that fish cannot be observed clearly in remote portions particularly of large aquariums.

Accordingly, the principal object of the present invention is the provision of a display device consisting of a hollow, transparent body member open only at its bottom and adapted to be supported while filled with water in a position with its bottom just below the water surface of a larger body of water but with its major portion above said water surface, so that fish from the larger body of water may enter and swim therein, whereby to be viewed clearly. The dimensions of the body member may be so selected that the fish may be viewed through only a thin section of water. As long as the vertical height of the body member above the surface of the larger body of water is less than the height of a water column supportable by atmospheric pressure, the body member will be maintained full of water by said atmospheric pressure.

Another object is the provision of a fish display device of the character described wherein said body member is internally partitioned to constitute a maze having separate inlet and outlet openings, whereby fish are encouraged to follow an elongated path within said maze and are hence better displayed.

A further object is the provision of a fish display device of the character described with the addition of water impellor means operable to create a unidirectional flow of water through the body member maze, whereby to encourage fish to swim through said maze in a direction opposite to said flow, by taking advantage of the instinctive inclination of most fish to swim against a current.

A still further object is the provision of a fish display device of the character described having a special stand for supporting the transparent body member in proper relation to the surface of the larger body of water, said stand being adjustable to compensate for varying depths of said water body, and for any out-of-level inclinations of the bottom of said water body.

Other objects are simplicity and economy of construction, and efficiency and dependability of operation.

Figure 3:
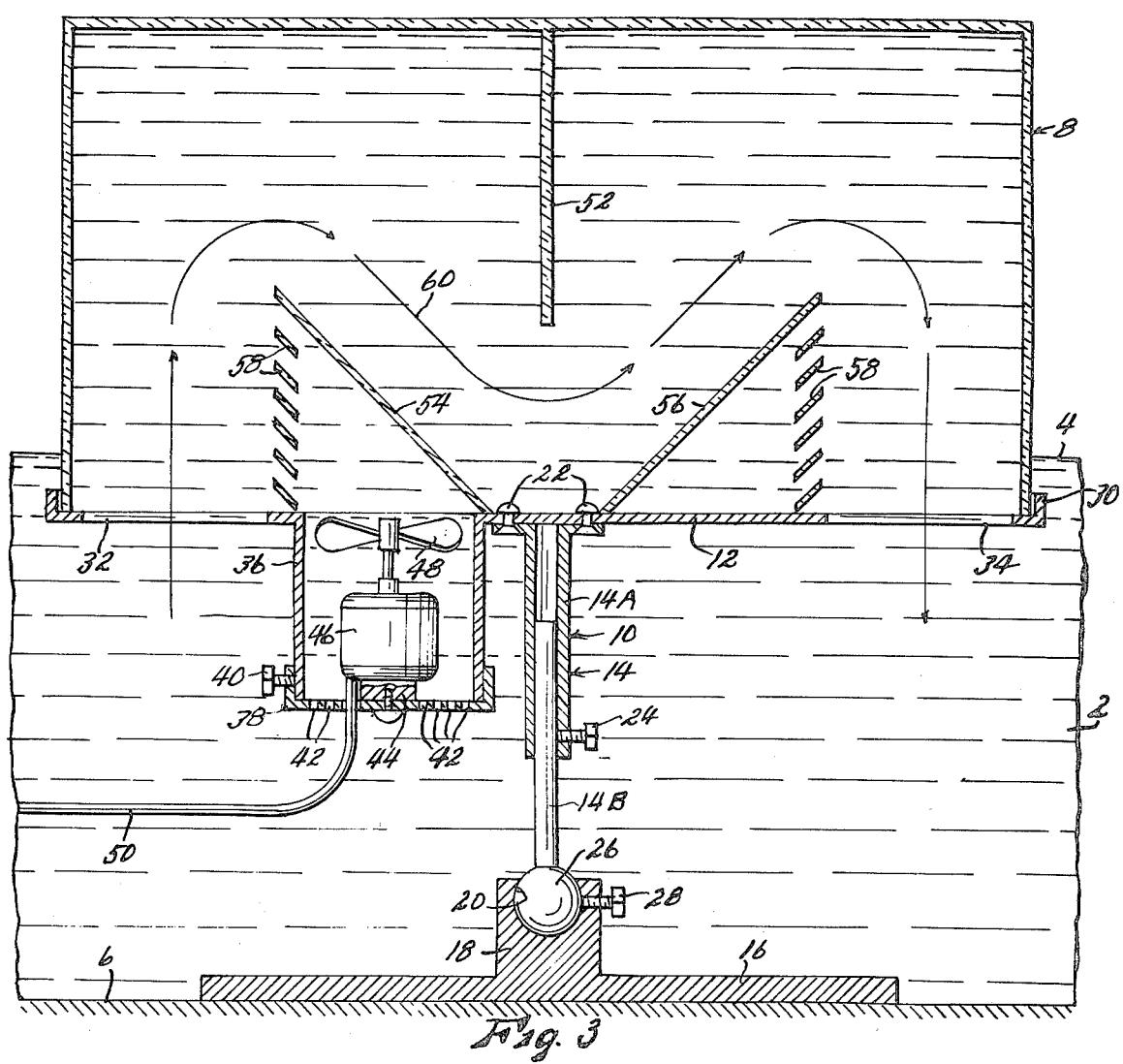

With these objects in view, as well as other objects which will appear in the course of the specification, reference will be had to the accompanying drawing, wherein:

FIG. 1 is a side elevational view of a fish display device embodying the present invention, disposed in operative relationship to a larger body of water, FIG. 2 is an end elevational view of the device as shown in FIG. 1, and FIG. 3 is an enlarged sectional view taken on line III—III of FIG. 2.

Like reference numerals apply to similar parts throughout the several views, and the numeral 2 applies to the water of some body of water larger than that contained in the display device forming the subject matter of the present invention, such as an aquarium, fish pond or pool, or the like. The surface of said body of water is indicated at 4, and the bottom or floor thereof at 6. The display device forming the subject matter of the present invention consists generally of a body member 8 and a stand 10 for supporting said body member.

Stand 10 consists generally of a top tray 12, a standard 14, and a base 16. Base 16 is preferably heavy, being formed of solid metal of the like, and rests on the bottom 6 of water body 2. It may be circular as indicated, and is provided centrally of its top surface with an upright boss 18 in which is formed an upwardly opening spherical socket 20. Standard 14 is adjustable in length, consisting of a tubular upper portion 14A affixed centrally at its upper end to tray 12, as by rivets 22, and a rod-like lower portion 14B telescopingly slidable in tube 14A and fixable therein by set screw 24. Rod 14B is provided at its lower end with a spherical knob 26 engaged for universal pivoting movement in socket 20, and fixable therein by set screw 28.

Tray 12 may be formed of metal, plastic or any other suitable material, and is essentially planar and horizontal, except for a raised lip 30 around its entire periphery. As shown, it is rectangular in horizontal contour, and has a water inlet opening 32 formed therethrough adjacent one end thereof, and a water outlet opening 34 formed therethrough adjacent its opposite end. Intermediate inlet 32 and standard 14, the tray is provided with a depending cylindrical well 36, which may be integral therewith, said well opening upwardly through the tray, and also being open at its lower end. Its lower end is covered by a cap 38 secured releasably thereto be set screw 40, and having perforations 42 formed therethrough. Mounted on said cap by means of bracket 44, and disposed within well 36, is an electric motor 46 which drives a water impellor screw 48 operable to draw water upwardly through perforated cap 38 and deliver it upwardly from said well to zones above the tray. It will be understood that motor 46 is of a waterproof type which can function efficiently while submerged in water, and that the cable 50 by means of which operating electric current is supplied to the motor is also waterproof.

As shown, body member 8 is rectilinear in form, being hollow and transparent, and being completely sealed and waterproof except that it is open at its bottom. It may be formed of transparent plastic, glass or the like. It is supported at its bottom on tray 12, its bottom horizontal contour being such as to be engaged closely within lip 30 of said tray, and in this position it completely covers inlet and outlet openings 32 and 34, and well 36. Internally, the body member is partitioned to form a maze passage interconnecting the inlet and outlet openings. This maze may have any desired degree of simplicity or complexity, but as shown is formed by a wall 52 depending from the top of the body member midway between its ends and transverse to its major horizontal axis, said wall terminating above the bottom of the body member, a pair of inclined walls 54 and 56 extending from the bottom of the body member approximately midway between its ends and inclined upwardly and outwardly in opposite directions, said inclined walls terminating short of the ends and top of the body member, and a series of inclined louvers 58 arranged in a vertical line between the bottom of the body member and the outer or upper end of each of walls 54 and 56. Each set of louvers forms a skeleton wall, the individual louvers of each set being spaced apart by distances too small to admit a fish therebetween, and being inclined upwardly toward the adjacent end of the body member. It will be understood that all of walls 52, 54 and 56, as well as louvers 58, extend all the way between the side walls of the body member, and are affixed thereto. All portions of the body member may in fact be an integrated unit, being formed in a single molding of plastic or the like. It will be seen that the skeleton wall formed by louvers 58 beneath the outer end of inclined wall 54 is disposed intermediate water inlet opening 32 and well 36 of the tray, and that the body member zone between said skeleton wall and wall 54 is interconnected with well 36. The maze path from inlet opening 32 to outlet opening 34 is indicated by arrowed line 60.

In operation, stand 10 is placed in water body 2 so that its base 16 rests on the bottom, and adjusted so that tray 12 is disposed level and perhaps one or two inches beneath the water surface 4. If the bottom 6 of water body 2 is not level, the tray nevertheless may be levelled by loosening set screw 28, pivoting ball 26 in socket 20 to make standard 14 vertical, and retightening the set screw. Variable depths of water body 2 can be compensated for by loosening set screw 24 to adjust the effective length of standard 14. Body member 8 may then be removed from the tray and inverted in water body 2 to fill it with water. The body member is then turned to an upright position, while still submerged, and lifted into position on tray 12 as shown, taking care that the bottom of said body member at no time is lifted above the water surface 4. The body member will then remain full of water, the water therein being supported above water level 4 by atmospheric air pressure, so long as the elevation of the body member above surface 4 does not exceed the water pressure equivalent of one atmosphere, which of course is more than 33 feet.

Fish in water body 2 may then enter the body member through openings 32 or 34, and swim about therein above water level 4, where they will be clearly displayed to view. The walls of the body member are of course transparent, acting as windows, so that the interior of the body member is fully lighted by exterior light, and prevent any interruption of view which would be caused by reflections or wind roughening of a water surface when attempting to view the fish through a free water surface. Also, while the interior dimensions of the body member would of course be selected to accomodate fish of a particular general size existing in water body 2, the configuration of the body member may be selected so that the fish may be viewed through a relatively thin section of water, so that the view-obstructing properties of murky water are minimized. For example, the body member as shown is much thinner from side to side than from end to end, so that fish may be viewed through a relatively thin section of water from either side of the body member.

While the operation as thus far described is effective, the display efficiency of the device is still further improved by the provision of motor-driven water impellor screw 48, the operation of which induces a continuous flow of water from body 2 inwardly through inlet 32, along the path indicated by line 60 through the body member, in the direction of the arrowheads of said line, and outwardly through outlet 34. Many, if not most, species of fish have an instinctive tendency to swim against a current, so that they are encouraged to swim through the body member along line 60, in a direction opposite to its arrowheads, so that they will be better displayed, both by making more trips along the path, and by travelling the full length of the maze when they do enter. On the other hand, if some fish should prefer to swim or drift with the current, the current will still act to encourage their movement through the body member, although they will then of course move in the direction of the arrowheads of line 60. In either event, the fish are prevented from approaching or contacting impellor screw 48, which might injure them, by the close spacing of louvers 58. The normal direction of movement of the fish could be reversed if desired by reversing motor 46, which would reverse the direction of the current. The provision of louvers 58 beneath the outer edge of inclined wall 56 permits end-for-end reversal of the body member in tray 12 without affecting the operation of the device. If this feature is not desired, tray 12 and the body member could be provided with interengaging index means preventing insertion of the latter into the former in any but its operative position, and louvers 58 under wall 56 could be eliminated or replaced with a solid wall.

While I have shown and described a specific embodiment of my invention, it will be readily apparent that many minor changes of structure and operation could be made without departing from the spirit of the invention. For example, the body member could be greatly enlarged with a view to lengthening of maze path 60, and the maze could be much more complex than that shown, in order to produce longer and more decorative patterns of movement of the fish for better and more attractive display thereof. In longer and more complex mazes, however, the use of impellor screw 48 becomes increasingly necessary, since the current generated thereby "guides" the fish through the maze. With the current to guide them, the fish are not likely to be "lost" or trapped even in rather intricate mazes.

What I claim as new and desire to protect by Letters Patent is:

1. A fish display device comprising:
  a. a hollow, transparent body member open at its bottom but otherwise sealed, and adapted to contain water,
  b. supporting means operable to support said body member in a larger body of water so as to project above the surface of said water body but extending beneath said surface, whereby water in the elevated portion of said body member is retained therein by atmospheric air pressure, said supporting means including a tray engageable by the bottom of said body member and having two spaced apart apertures formed therethrough, whereby the interior of said body member forms a path along which fish entering said body member from said water body through one of said tray apertures may swim through said body member to and outwardly through the other of said tray apertures, and
  d. water impellor means carried by said supporting means and operable to produce a current of water inwardly into said body member through one of said tray apertures and outwardly from said body member through the other of said apertures.

2. A fish display device as recited in claim 1 wherein said supporting means comprises:
   a. a base supportable on the bottom formation of said water body,
   b. an upright standard carried by said base, said tray being fixed to the upper end of said standard,
   c. a first adjusting means operable to vary the angularity of said standard universally relative to said base, whereby to level said tray despite out-of-level configuration of the bottom formation of said water body, and
   d. a second adjusting means operable to adjust the effective height of said standard, whereby said tray may be disposed at the desired spacing below the top surface of said water body despite variations in the depth of said water body.

3. A fish display device as recited in claim 1 wherein the interior of said body member is partitioned to constitute a maze of any desired complexity interconnecting said tray apertures, and wherein said water impellor means is operable to impel water from said water body upwardly into said body member at a position adjacent one of said tray apertures.

4. A fish display device as recited in claim 3 wherein said maze path does not occupy the entire interior of said body member, and wherein said water impellor means constitutes a power-driven impellor screw carried by said tray and operable to impel water from said water body upwardly into said body member adjacent one of said tray apertures, but into a zone of said body member not included in said maze path, and with the addition of a louvered wall between the maze path adjacent one of said apertures and the body member zone into which water is impelled by said screw, the louvers of said wall being spaced sufficiently closely to prevent the passage of fish therebetween, and angled to direct water into said body member in a direction away from the adjacent tray aperture.

* * * * *